United States Patent [19]

Vasseur et al.

[11] 4,256,357

[45] Mar. 17, 1981

[54] SET OF CONNECTING ACCESSORIES FOR AN ELECTRICAL SUPPLY RAIL WITH AN ASYMMETRICAL PROFILE

[75] Inventors: Bernard Vasseur; Alain Boucaut, both of Lamotte Beuvron, France

[73] Assignee: Lita, Lamotte Beuvron, France

[21] Appl. No.: 28,855

[22] Filed: Apr. 10, 1979

[30] Foreign Application Priority Data

Apr. 14, 1978 [FR] France ............................... 78 11060

[51] Int. Cl.³ .......................... H01R 9/00; H02G 3/06

[52] U.S. Cl. .................................................. 339/21 R

[58] Field of Search ................ 339/21 R, 22 R, 22 B, 339/24

[56] References Cited

U.S. PATENT DOCUMENTS

| | | | |
|---|---|---|---|
| 3,825,879 | 7/1974 | Hesse | 339/21 R |
| 3,871,730 | 3/1975 | Hesse | 339/21 R |
| 4,163,595 | 8/1979 | Vasseur | 339/88 R |

FOREIGN PATENT DOCUMENTS

| | | | |
|---|---|---|---|
| 2123152 | 3/1973 | Fed. Rep. of Germany | 339/22 B |

*Primary Examiner*—Neil Abrams

*Attorney, Agent, or Firm*—Cushman, Darby & Cushman

[57] ABSTRACT

A set of connecting accessories for an electrical supply rail with an asymmetrical profile, comprising a first main accessory called a "line connector" enables the conductors of two rails to be connected electrically, no matter whether the link be on the right or the left of the rail, without it being necessary to have a fool proofing device, a second accessory called "universal supply box," and a third accessory called "connecting block". The combination of such a set of accessories making it possible with a minimum number of elements of different kinds to produce, with an asymmetrical type rail, all the assembly figures : straight line, T shape, L shape, cross shape.

4 Claims, 7 Drawing Figures

SET OF CONNECTING ACCESSORIES FOR AN ELECTRICAL SUPPLY RAIL WITH AN ASYMMETRICAL PROFILE

The present invention relates to a set of accessories for an electrical supply rail with an asymmetrical profile.

The use of electrical supply rails offers very many advantages. They can be run along ceilings, walls and skirtings and then act as sockets for apparatuses which can be moved at any time without calling in a specialist. However, for these advantages to be properly appreciated, the assembly of the rails must be possible without difficulties; in particular, the user, when the connecting and/or supply accessories are installed, should not be left wondering for a long time how the various items fit together on the one hand and the number of accessories required for all configurations should be a minimum on the other.

It is an object of the present invention to satisfy both these requirements. It relates more especially to a set of connecting accessories at least for a first electrical supply rail with an asymmetrical profile containing (n) conductors, which is intended to be joined to at least one other element with (n) conductors, this rail having two connecting slideways in two different planes, the set being characterized by the fact that it includes at least a first accessory, called a "line connector", which is symmetrical with respect to a plane (x, y, z) formed by an insulating support containing two guides which ensure its fitting in the two slideways of the rail and on which are mounted (n) conducting contact parts with left and right wings on a centre section, which are designed to ensure that the line connector clips into the elements to be joined, the plane (x, y, z) then being perpendicular to the longitudinal axis of these elements, these wings, after clipping in, pressing on the corresponding conductors of the elements to be joined.

Figure 1:
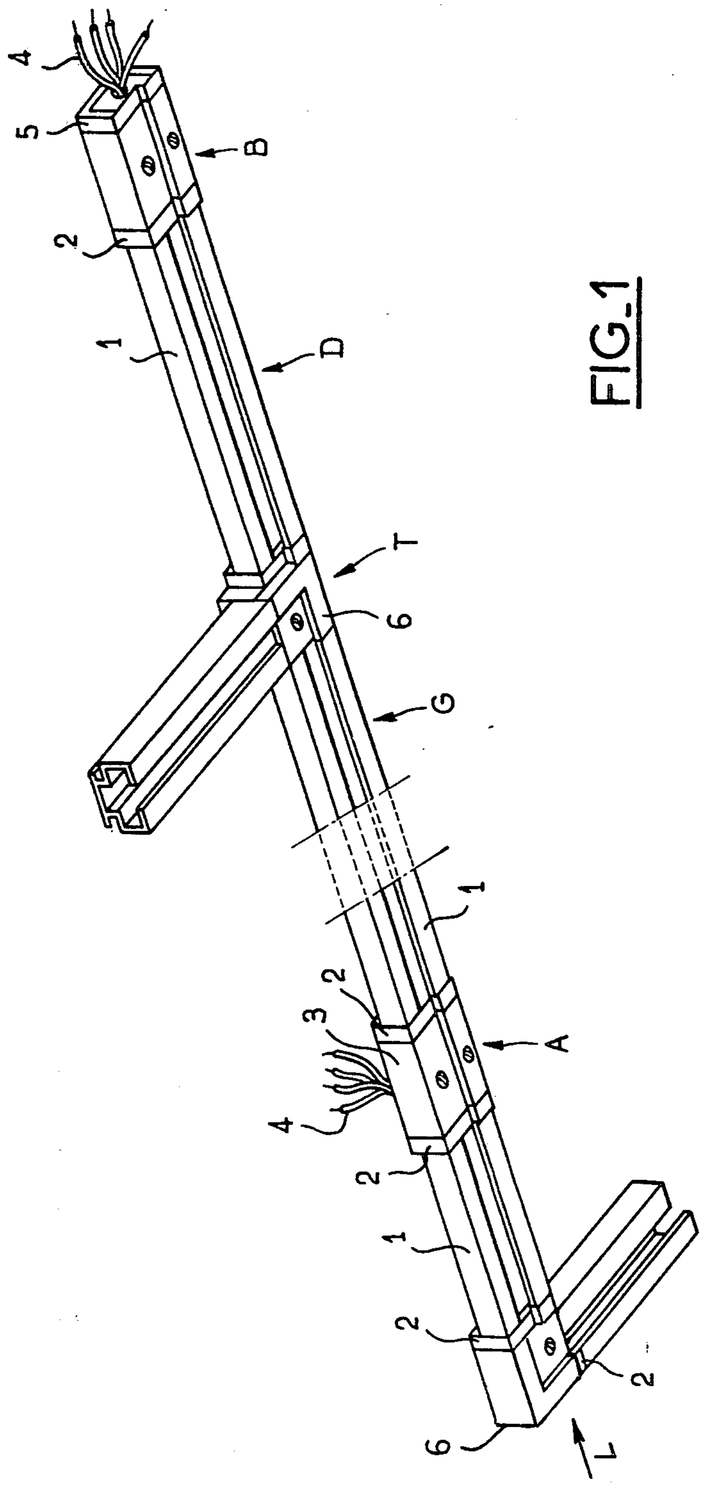
Figure 2:
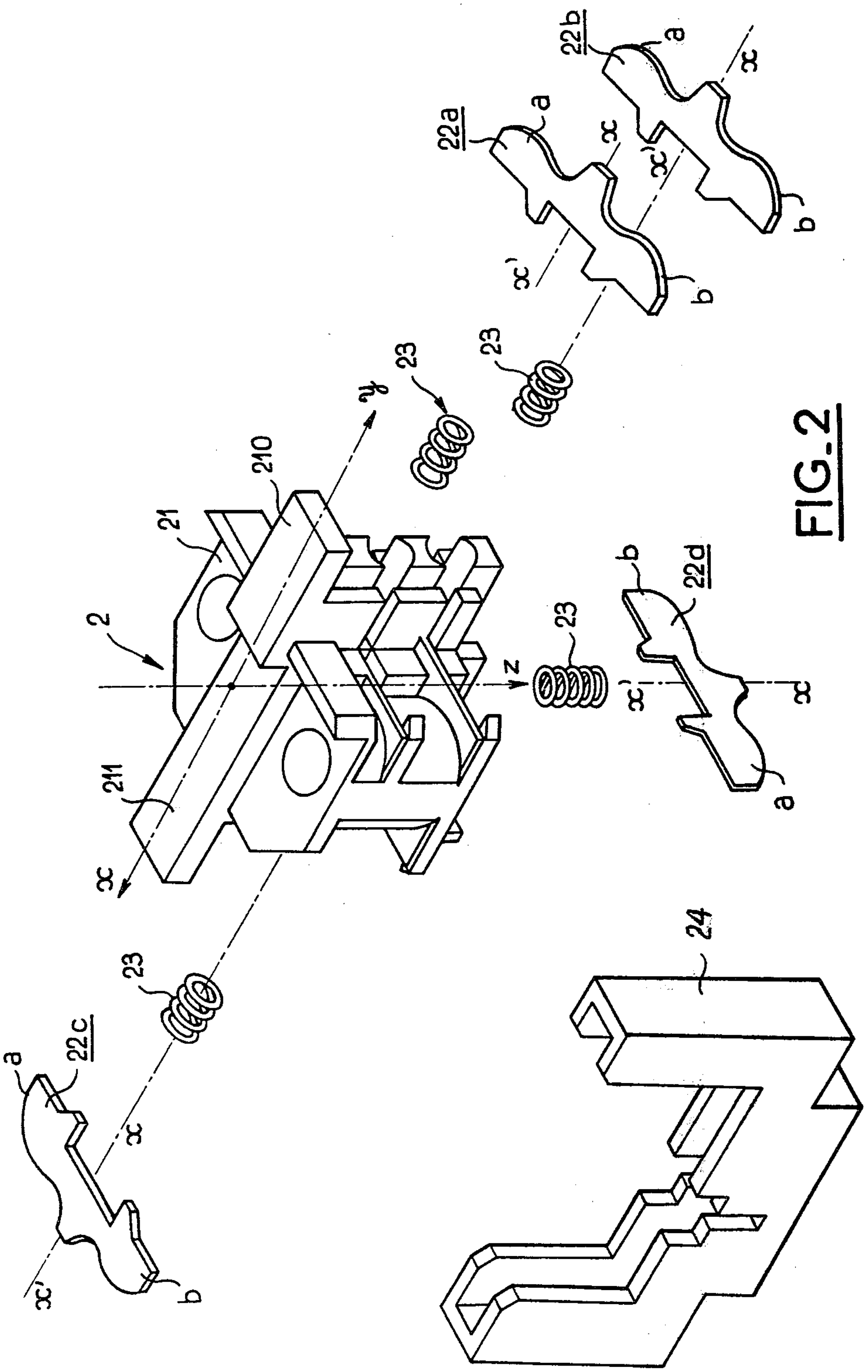
Figure 3:
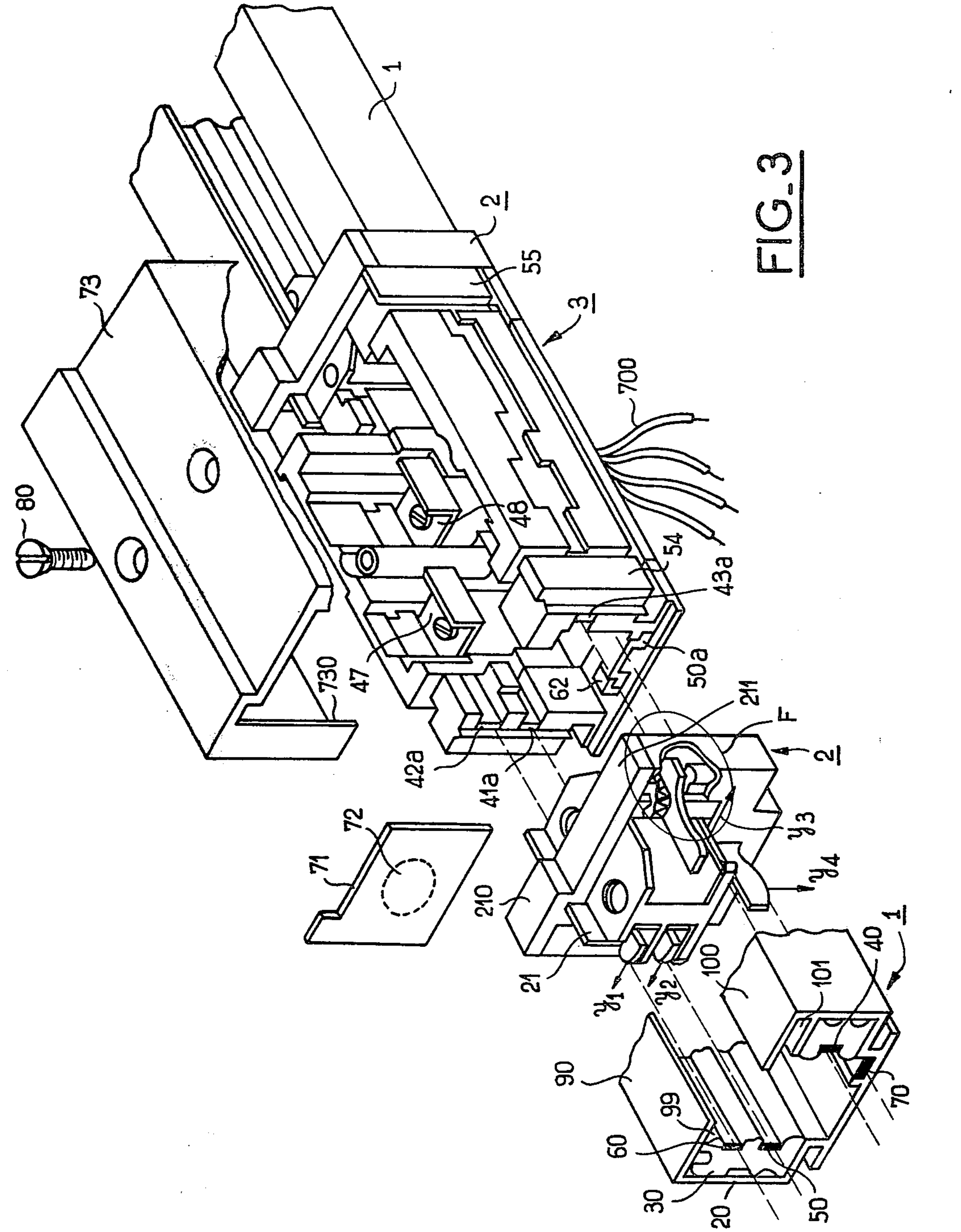
Figure 4:
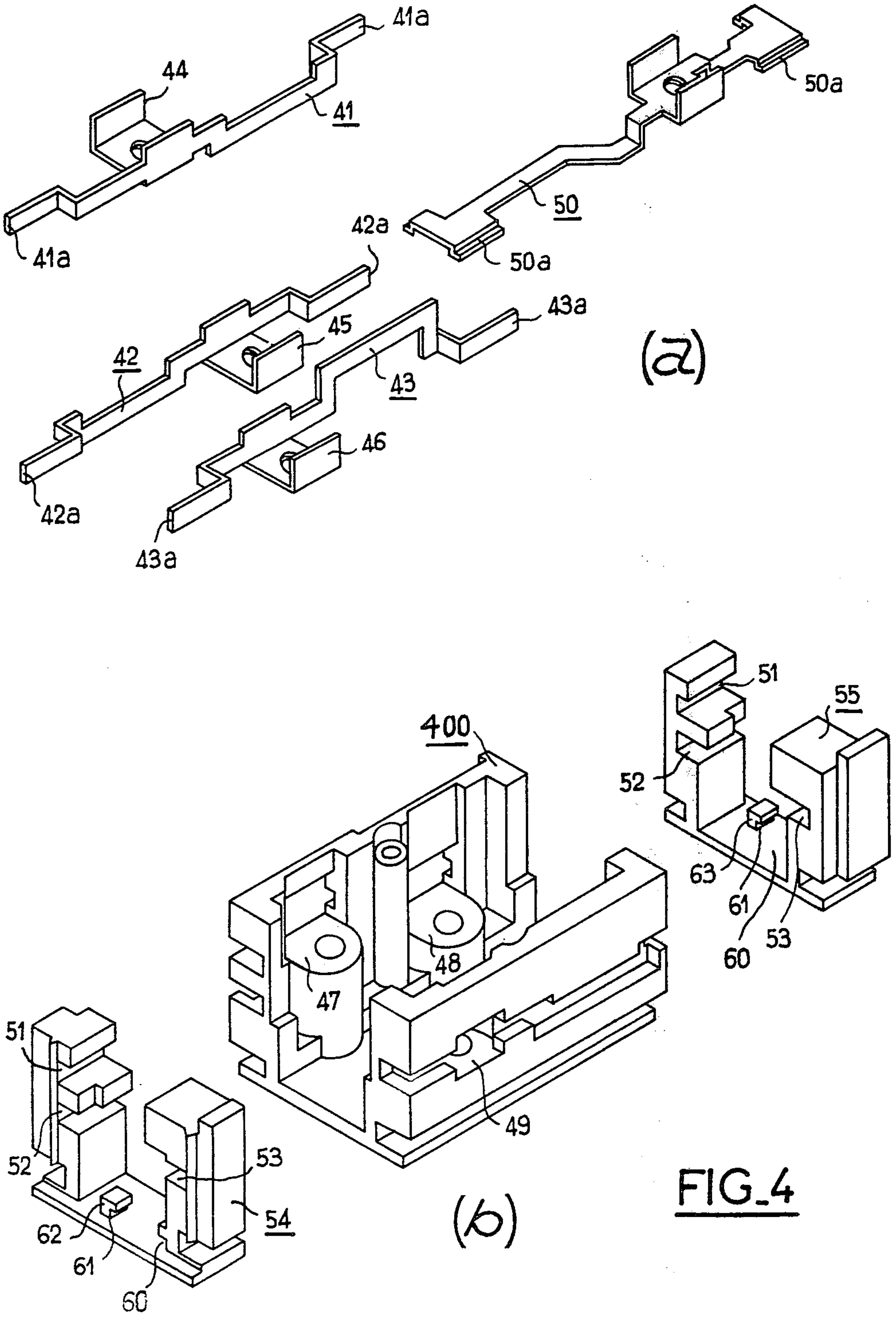
Figure 5:
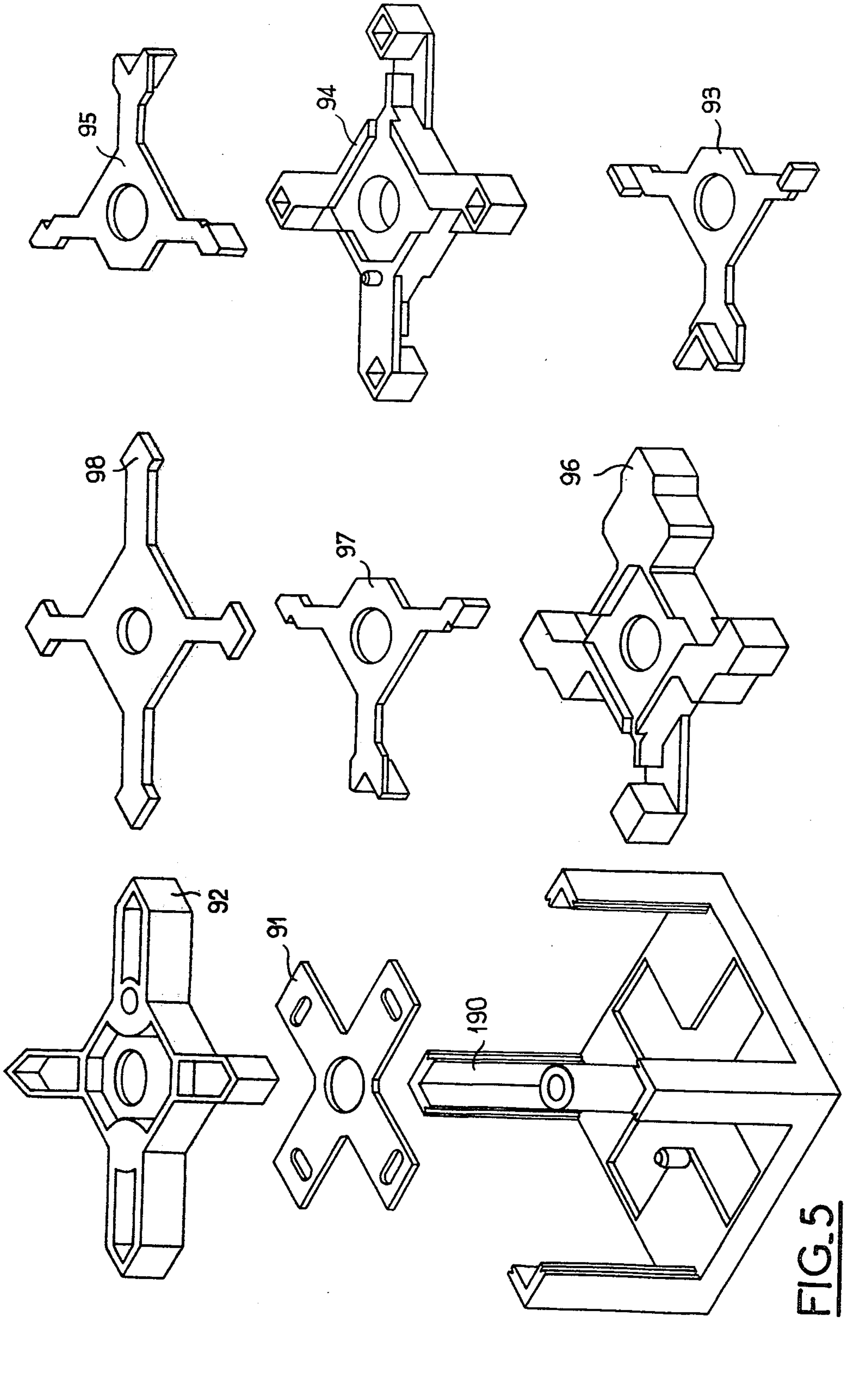
Figure 6:
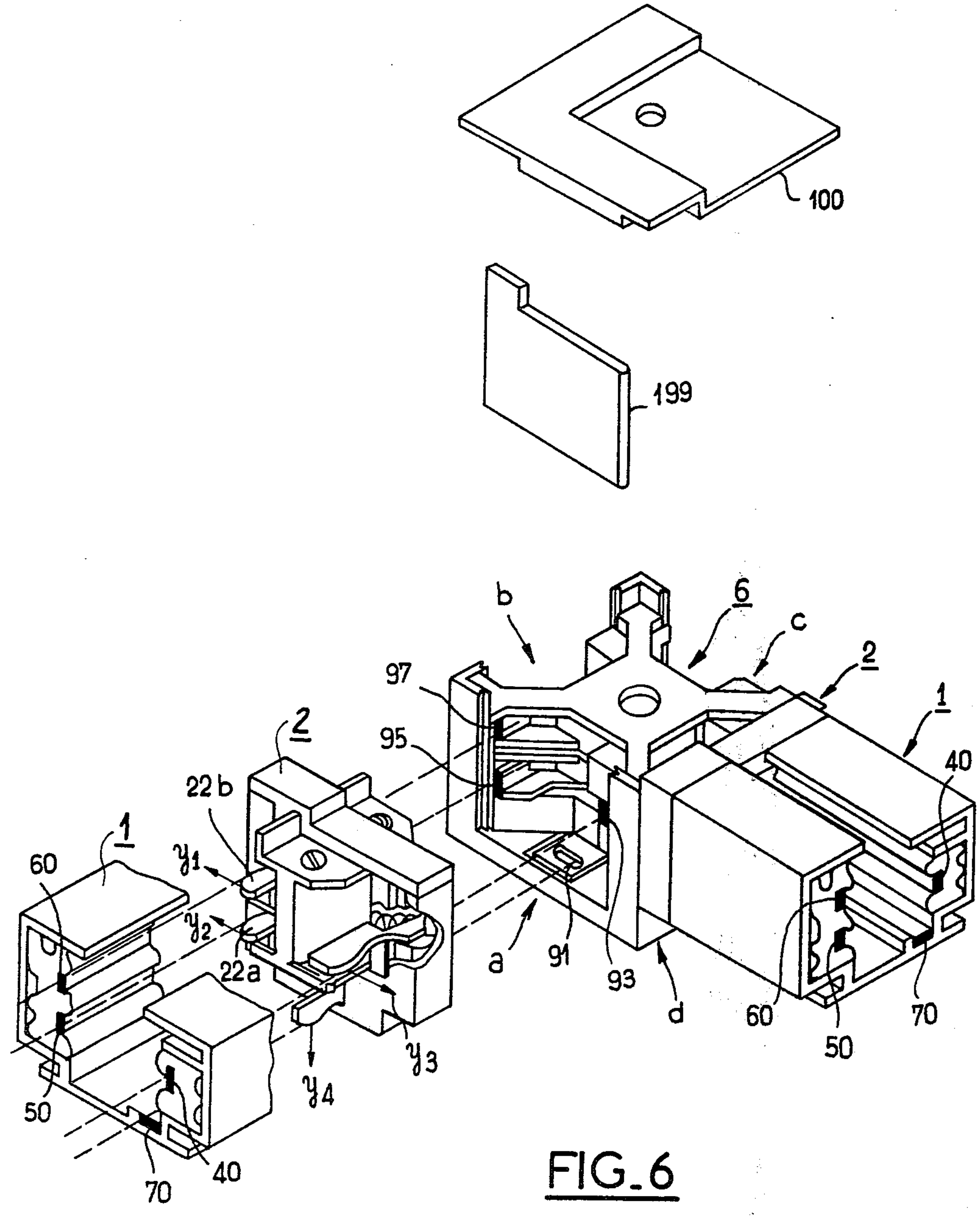

The invention will be better understood by means of the explanations which follow and the figures attached in which:

FIG. 1 shows some of the figures which can be made using a set of accessories in accordance with the invention, FIG. 2 shows the various elements forming this line connection before they are assembled, FIG. 3 shows schematically a way of making such an installation using a first accessory called a "line connector" with other elements of an installation and, in particular, a rail and a second accessory called a "universal supply box", FIG. 4 (*a*) and (*b*) shows schematically the components which, after assembly, form the second accessory, FIG. 5 shows schematically the components which, after assembly, form a third accessory called a "connecting block", FIG. 6 shows schematically an example of an assembly with a connecting block.

The same elements bear the same reference numbers in all the figures.

The construction of all the assembly figures for a rail requires classically the use of connecting and supply accessories which, together with the rail, ensure electrical continuity of the whole and the application of voltage. However, each of these accessories is of a different type depending on whether the supply is fed in centrally or from the right hand or left hand end of the rail. In the same way, the connecting accessories must be paired up depending on whether the end of the rail to be connected is on the right or the left. Under these conditions, a big stock of elements of different types must be available, which complicates stock management and installation maintenance problems.

This problem is solved with a set of accessories in accordance with the invention.

FIG. 1 shows schematically, as an example, some of the figures which can be made using such a system. It can be adapted more especially to a rail 1 which is shown more in detail in the following figures. Rail 1 consists mainly of a channel and asymmetrical slideways situated in two different and parallel planes in which the conductors are fitted. The first assembly example referenced A is of an installation with a section of rail 1 connected by means of a first accessory called a "line connector" 2 to a second accessory called a "universal supply box" 3. The main conductor 4 connecting this box to the power supply is brought out from the bottom of the box in this case (the supply is at a centre point). Two other examples are also shown in FIG. 1. They are T or L shaped figures which require a first section of rail 1 on the left for example (side G) for the T assembly. This section is connected to a second section of rail 1 on the right (side D) and a third section of rail 1 perpendicular to the preceding sections. The electrical link between these various sections of rail is through a third accessory called a "connecting block" 6 which will be described in more detail later. This T figure is supplied, for example, by a universal supply box 3 whose main conductor 4 is brought out this time from the right end of the box (assembly B). No matter whether the link between the various elements is on the right or on the left, the same type of line connector 2 is used. In the same way, no matter whether the supply is fed in from the right or left ends or in the centre, a single type of supply box is used. Only the lead-out of the main supply conductor varies. Hence, the user, with a set of only three types of accessory, can construct all the figures he requires in the same plane, or by using a flexible connector of any classical kind, the same figures in two perpendicular planes. This is a set of accessories in accordance with the invention which is much less complex than known accessory sets.

FIG. 3 shows schematically a section of rail 1 which is intended to be connected to a supply box 3 through a line connector 2, which is shown disassembled in FIG. 2. It could be connected to another rail. This rail 1 is of the type which is described in U.S. Pat. No. 4,163,595. This rail consists of channel made of anodized aluminium 20, for example, by extrusion in which is a sheath 30 of polyvinyl chloride or some other material complying with current standards. A number (n) of conductors are embedded in this insulating sheath. This number (n) is an integer number which is four in the example described. Conductor 40 corresponds to the supply neutral and conductors 50 and 60 to the first and second phases respectively. The rail also contains a tinned copper conductor 70 intended as ground in accordance with current standards. A screw 80 enables the rail to be fitted to the surface intended to receive it, which may be a floor, ceiling or wall for example. At least two locating flanges 90 and 100 are provided on one side and on the other of the rail's longitudinal axis and define slideways 99 and 101 intended to receive the guides provided either on the connecting accessory or on the adapter for the movable connection of the apparatus to be supplied. The main characteristic of these flanges is that they are asymmetrical. Flanges 90 and 100 are not in the same plane.

Such a rail 1, when it is used in an installation, is combined with other electrically conductive elements. For example, it may be intended to be joined to another rail or to any one of the accessories in the set in accordance with the invention. This link is provided by means of a first basic accessory called a "line connector" 2 whose component parts are shown unassembled in FIG. 2. This line connector 2 includes a support element 21 of insulating material whose shape is adapted to the rail profile. It contains in particular a set of guides 210 and 211 which can be housed in and slide in slideways 99 and 101 which are limited by housing flanges 90 and 100 of asymmetrical rail 1 already described. Contact parts **22*a*, 22*b*, 22*c*, and 22*d* are assembled on support 21. These contact parts are symmetrical with respect to their axis (xx'). They have a central body of conducting material ending on one side and on the other with two wings (a) and (b), one on the right and the other on the left. They are symmetrical and, when line connector 2 is later clipped in the two elements to be joined, they press on the corresponding conductors by means of springs 23. The number (n) of contact parts is the same as the number (n) of conductors to be joined which are on the elements to be connected on one side and on the other of this line connector. This last is symmetrical with respect to a central plane (x, y, z), which is perpendicular to the longitudinal axis of the rail into which it must clip so that it may be clipped into rail 1 either on its right or on its left. Also, from its own shape, by means of guide 210 in particular, its orientation "top and bottom" (bottom corresponding to the ground contact 22*d*) for clipping in is determined without ambiguity. An example of clipping in is presented in FIG. 3. These contact parts or conductors 22*a*, 22*b*, 22*c* and 22*d* of the line connector are applied from the left hand side to conductors 50, 60, 40 and 70 of the rail on the left in FIG. 3 and from the right hand side to conductors 41*a*, 42*a*, 43*a* and 50*a* of another element of the second accessory 3. A detail view F shows the function achieved by springs 23 on the contact parts. The dotted lines traced on FIG. 2 show schematically the continuity of the electrical links when the various elements are fitted one in another. A cover 24 protects line connector 2. The arrows $y_1$, $y_2$, $y_3$ and $y_4$ represent the force of the contact parts or conductors of line connector 2** on the conductors of the elements which it joins electrically.

The elements forming the second accessory, called a universal supply box 3, are shown in detail in FIGS. **4(*a*) and 4(*b*) which are described together with FIG. 3**.

This box consists mainly of a support block 400, which is designed to receive the contact parts or conductors 41, 42 and 43 which are fixed to this support block by means of the feet 44, 45 and 46 which are held in place by screws on the sockets 47, 48 and 49 provided for the purpose. Contact part 50 provides contact with ground. The ends of these contact parts or conductors **41*a*, 42*a*, 43*a* press in housings 51, 52 and 53 arranged to receive them in an element complementary to the connection box, which is called a conformer, is referenced 54 and 55 and is applied on one side and on the other of support block 400 respectively. The ends 50*a* of the ground contact fit in each of the conformers 54 and 55 in housings formed in the shaped part that is the conformer and a housing 61 formed by bosses 62 and 63. In the layout shown in FIG. 3 supply line 700 is central but it could be at one end or the other. In this case a partition 71 with a membrane 72, which can be pushed in, is housed in a recess 730 provided for the purpose in the cover 73 and closes the box on the side from which it is fed, i.e. either the right or the left, unless it is fed in the centre, i.e. through the bottom of this box. Cover 73 is held in position by any appropriate means, by a screw 80** for example.

An L shaped figure can be obtained by means of a connecting block shown disassembled in FIG. 5 and fully assembled in FIG. 6.

A support frame 190 receives in succession a cross-shaped ground contact 91, a first separator 92, a first contact 93, a second separator 94, a second contact 95, a third separator 96, a third contact 97 and a final separator 98. The respective shapes of the separators and contacts work together to enable them to be stacked, one fitting in another to free the end of the contacts in four planes or on four sides (a, b, c, d) against which the contacts subject to the pressure of a line connector spring rest as previously described by means of FIGS. 2 and 3. In FIG. 6 a link block 6 with all its components assembled is shown. They work with the line connectors 2 to form an L shaped rail assembly 1. Dotted lines show the alignment of the contacts or conductors of the block and the conductors in the rails which, when the assembly is completed, form the electrical link for these elements. The figure shown is for an L shaped assembly but it is possible with this link block to form a T or cross shaped figure also. A side wall 199 closes the sides of the block which are not used while a cover 100, held in position by means of a screw for example, provides protection for the contacts.

A set of accessories in accordance with the invention makes it possible with a minimum number of elements of different kinds: link block, line connector and universal supply box: to produce, with an asymmetrical type rail, all the assembly figures, straight line, T shape, L shape, cross shape, required without it being necessary to be troubled by the rail arrival and departure directions. Management of spare part stocks is much reduced and maintenance of installations made easier.

What is claimed is:

1. A set of connecting accessories for connecting at least one electrical supply rail to a second element, said rail and element having two slideways in two different planes, said rail having an asymmetrical profile containing n conductors to be joined to n conductors of said element comprising:

a line connecting accessory including an insulating support having two guide portions for engaging said slideways of said rail and element; and n conducting contact parts each having right and left wings and a central part, one of said wings of each contact part electrically connecting to a conductor of said element and the other wing connecting to a conductor of said rail; said support being symmetrical with respect to a central plane perpendicular to the longitudinal axis of said rail so that said connector can be clipped to either end of a rail; and a universal supply box for receiving one of said guide portions and one of said wings of each of said n contact parts so as to clip and electrically connect said line connecting accessory thereto, including a support block having a plurality of sockets and first and second sides, first and second conformers joined to said sides, n contact parts extending from said first side to said second side and into said conformers, each contact part of said supply box having at least one foot for being fixed to one of said sockets, each of said conformers being adapted for receiving a line connecting accessory with a wing electrically connecting to an end of one of said contact parts of said supply box, and a main supply conductor for electrically connecting a power supply to said n contact parts of said supply box.

2. A set of accessories as in claim 1, wherein said main conductor passes through the bottom of the box.

3. A set of accessories as in claim 1 further comprising a third connection block accessory formed by a support frame on which (n) contacts separated by separators are stacked in succession, said (n) contacts having, after assembly, free ends on four sides (a, b, c, d) of said connecting block in such a way that said wings of at least one of said contact parts of said line connector press on these free ends on at least one of said four sides.

4. A set of accessories as in claim 3, wherein at least a wall closes at least one of said sides (a, b, c, d) of said block not joined to a line connector.

* * * * *